Oct. 27, 1953
G. KALLNER
2,657,070
INDIVIDUAL WHEEL SPRING SUSPENSION
Filed Feb. 1, 1950
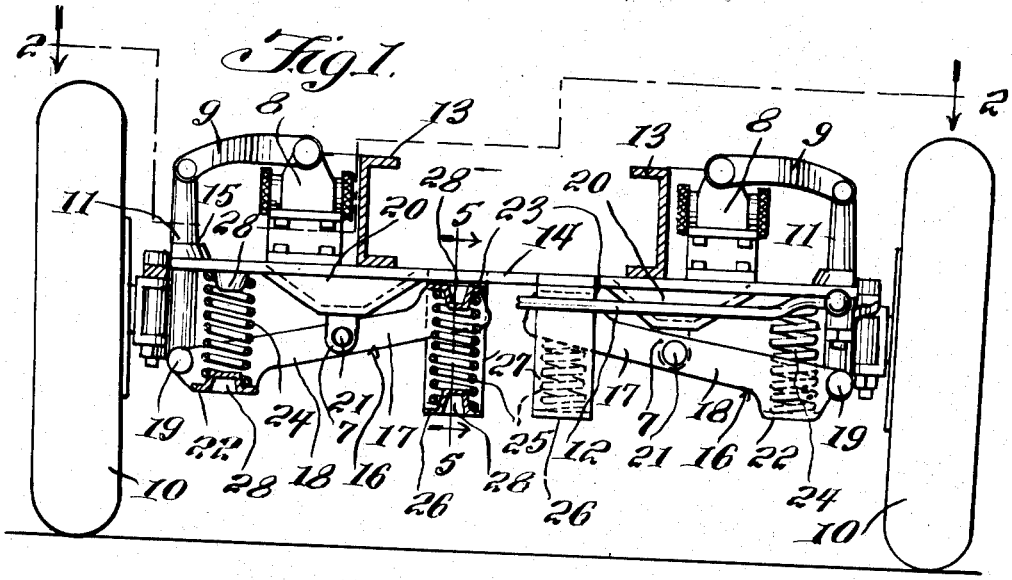
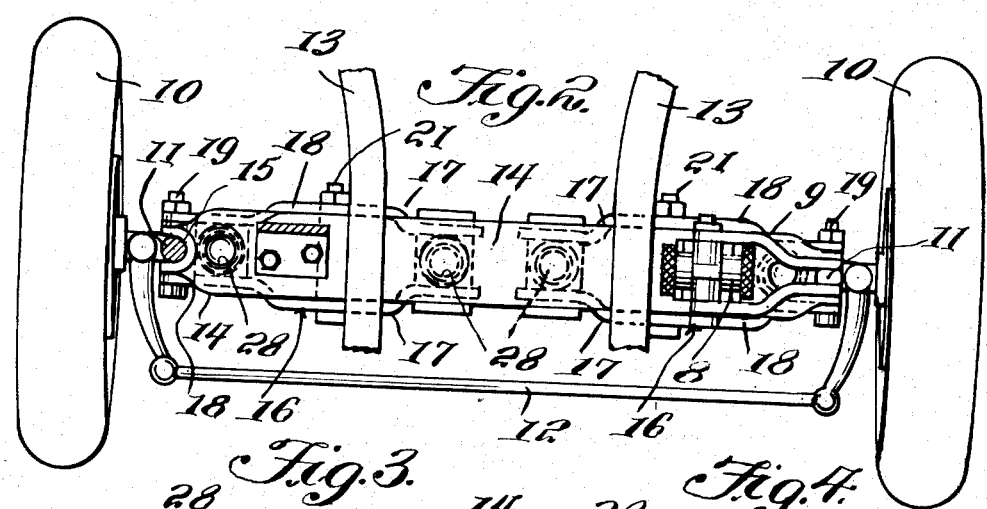
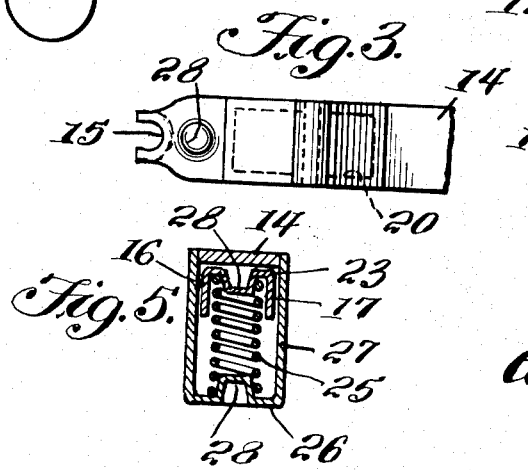
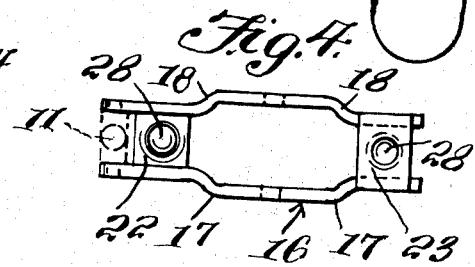
INVENTOR.
Gustave Kallner,
BY Victor J. Evans & Co.
ATTORNEYS Patented Oct. 27, 1953

2,657,070

UNITED STATES PATENT OFFICE 2,657,070

INDIVIDUAL WHEEL SPRING SUSPENSION

Gustave Kallner, Rockford, Ill.

Application February 1, 1950, Serial No. 141,761

2 Claims. (Cl. 280—96.2)

This invention relates to vehicles, and more particularly to a mechanism for spring mounting the bodies of vehicles so as to absorb road shocks.

The object of the invention is to provide a shock absorber or suspension mechanism which is adapted to be attached to a vehicle, whereby the vehicle body will be maintained substantially level so that the occupants of the vehicle can ride in comfort and safety.

Another object of the invention is to provide a shock absorber which includes a plurality of oppositely-acting springs that serve to cushion the vehicle body as the vehicle engages road bumps and the like.

A further object of the invention is to provide a vehicle shock absorber which is very simple and inexpensive to manufacture.

Other objects and advantages will be apparent during the course of the following description.

In the accompanying drawings forming a part of this application, and in which like numerals are used to designate like parts throughout the same:

Figure 1 is a front elevational view, with parts broken away and in section, showing the shock absorber of the present invention attached to a vehicle;

Figure 2 is a sectional view taken on the line 2—2 of Figure 1;

Figure 3 is a fragmentary top plan view of the body member;

Figure 4 is a plan view of one of the brackets;

Figure 5 is a sectional view taken on the line 5—5 of Figure 1.

Referring in detail to the drawings, the numeral 10 designates a pair of wheels, which may be the front wheels of an automobile or the like. The usual steering knuckle support 11 is operatively connected to each of the wheels 10, and a tie rod 12 is arranged between the pair of wheels 10.

The vehicle further includes a body or frame, and a portion of the frame is indicated by the numeral 13. Arranged contiguous to the bottom of the frame 13 is a horizontally-disposed body member 14 which forms part of the suspension mechanism of the present invention. The opposite ends of the body member 14 are bifurcated or cut away, as at 15, and these cutaway ends slidably embrace or receive the steering knuckle supports 11, as best seen in Figure 1. The sole purpose of the present invention is to provide a shock absorber which will cushion the vehicle body as the vehicle engages road bumps. A short arm 9 pivotally connects each of the steering knuckle supports 11 to a complemental shock absorber 8 that is secured to the top of the body member 14.

The suspension mechanism of the present invention further includes a pair of identical brackets 16 each of which includes a pair of spaced-apart legs 17 and 18. One end of the bracket 16 is open and this open end is pivotally connected to the bottom of the adjacent or complemental steering knuckle support 11 by a pin 19, Figure 2. A pair of spaced casings 20 are dependingly carried by the body member 14 and are secured thereto, as by welding, and a pin 21 serves to pivotally connect one of the brackets 16 to apertured ears 7 that are secured to each of the casings 20.

Each of the brackets 16 has the same construction, and each includes a first plate 22 and a second plate 23, the plates 22 and 23 extending between the legs 17 and 18 and being secured thereto. A first coil spring 24 is interposed or positioned between the first plate 22 and the body member 14, while a second coil spring 25 has its upper end arranged in engagement with the second plate 23.

The lower end of the coil spring 25 is arranged in engagement with a web 26 of a U-shaped frame 27, the frame 27 being secured to the bottom of the body member 14 in any suitable manner. The frame 27 slidably embraces the brackets 16.

For guiding the coil springs 24 and 25 and for insurance that the coil springs remain in their proper position, a guide projection 28 projects from each of the plates 22 and 23 and from the web 26, the guide projections 28 extending into the ends of the coil springs.

From the foregoing, it is apparent that a suspension mechanism has been provided which will effectively cushion road bumps as a vehicle moves along during its travel. Thus, when one of the wheels 10 engages a road bump, the wheels 10 and steering knuckle supports 11 can move upwardly relative to the body member 14 and frame 13, since the steering knuckle supports 11 slide or move freely in the cut-outs 15. However, the upward movement of the wheels 10 will be cushioned by the coil spring 24. Simultaneously, the coil spring 25 will serve to help cushion the clockwise pivotal movement of the bracket 16, since the coil spring 25 is interposed between the plate 23 and the web 26. Thus, the occupants of the vehicle will be able to ride comfortably and damage to the vehicle will be prevented. With the parts arranged as shown in Figure 1, the shock absorber of the present invention will only cushion the vehicle body as the vehicle wheels engage upwardly projecting road bumps or other upwardly extending projections, there being no effect on the vehicle as depressions in the road are encountered. In use, as a wheel 10 engages a road bump or other upwardly extending projection, the wheel 10 will be moved vertically with respect to the body member or frame 13 due to the provision of the sliding steering knuckle support 11. It will be seen from the drawing that the upward movement of the wheel 10 will be cushioned by the oppositely acting coil springs 24 and 25, since this pair of coil springs tend to cushion or limit clockwise pivotal movement of the bracket 16.

If desired, the apparatus of the present invention can be installed in a vehicle in lieu of the conventional shock absorber, or can be used in conjunction with the latter. By the previously-described arrangement of the springs 24 and 25, a double knee action is insured, so that the vehicle body will be kept on an even keel, whereby the body will not be jerked or moved from side to side.

What is claimed is:

1. In a vehicle, the combination with a frame, a pair of steering knuckle supports and a wheel operatively connected to each of said steering knuckle supports, of a suspension mechanism including a body member arranged contiguous to the bottom of said frame, a shock absorber secured to the top of said body member, the ends of said body member being bifurcated and slidably embracing said steering knuckle supports, an arm pivotally connecting said steering knuckle supports to said shock absorber, a pair of spaced casings dependingly carried by said body member, apertured ears depending from each of said casings, a bracket pivotally connected to said ears and including a pair of spaced apart legs, a pin pivotally connecting the ends of said brackets to said steering knuckle supports, a first plate secured to each of said brackets, a first coil spring interposed between said first plate and said body member, a pair of U-shaped frames secured to the bottom of said body member and slidably embracing said brackets, the U-shaped frames being provided with a connecting web, a second plate secured to each of said brackets, and a coil spring interposed between said second plate and said web.

2. In a vehicle, the combination with a frame, a pair of steering knuckle supports and a wheel operatively connected to each of said steering knuckle supports, of a suspension mechanism including a body member arranged contiguous to the bottom of said frame, a shock absorber secured to the top of said body member, the ends of said body member being bifurcated and slidably embracing said steering knuckle supports, an arm pivotally connecting said steering knuckle supports to said shock absorber, a pair of spaced casings dependingly carried by said body member, apertured ears depending from each of said casings, a bracket pivotally connected to said ears and including a pair of spaced apart legs, a pin pivotally connecting the ends of said brackets to said steering knuckle supports, a first plate secured to each of said brackets, a first coil spring interposed between said first plate and said body member, a pair of U-shaped frames secured to the bottom of said body member and slidably embracing said brackets, said U-shaped frames being provided with a connecting web, a second plate secured to each of said brackets, a coil spring interposed between said second plate and said web, and guide projections for maintaining said coil springs in their proper positions.

GUSTAVE KALLNER.

References Cited in the file of this patent

UNITED STATES PATENTS

| Number | Name | Date |
|---|---|---|
| 1,694,305 | Ascarelli | Dec. 4, 1928 |
| 2,075,585 | Martin | Mar. 30, 1937 |
| 2,092,611 | Olley | Sept. 7, 1937 |
| 2,347,948 | Hassett | May 2, 1944 |

FOREIGN PATENTS

| Number | Country | Date |
|---|---|---|
| 425,092 | Great Britain | Mar. 6, 1935 |
| 449,455 | Great Britain | June 26, 1936 |